[Column 1]

3,480,606
POLYMERIZATION OF ETHYLENIC MONOMERS
Jean Claude Thomas, Lyon, France, assignor to Produits Chimiques Pechiney-Saint-Gobain, Paris, France
No Drawing. Filed Dec. 27, 1965, Ser. No. 516,696
Claims priority, application France, Dec. 30, 1964, 400; Jan. 7, 1965, 1,157; Jan. 13, 1965, 1,757; Jan. 14, 1965, 1,923; Jan. 15, 1965, 2,098
Int. Cl. C08f 3/30, 15/24, 15/32
U.S. Cl. 260—92.8     11 Claims

ABSTRACT OF THE DISCLOSURE

A process for the manufacture of ethylenic polymers, and particularly polyvinylchloride, in the form of smoother spherical particles, which involves a two stage polymerization using a sequence of different catalysts and different modes of agitation.

---

This invention relates to the manufacture of vinyl chloride polymers, a term which includes homopolymers and copolymers, in mass, otherwise called in bulk, which means polymerization or copolymerization in the absence of solvents and diluents.

Polyvinyl chloride is classically produced in mass as cloudlike forms of irregular shape varying from minute specks to irregular, non-globular, masses. In application Ser. No. 97,982 is described a polymerization in mass which produces the first spherical globules of polymer, which are ovoid spheres, nodulated, and accompanied by multitudes of minute specks of polymer. In application Ser. No. 345,944 is described a polymerization in mass in two steps in one vessel which produces more of the ovoid spheres, freer of nodules, fewer of the minute specks, and a massive improvement in granulometry. In application Ser. No. 347,147 is described a polymerization in mass in two steps separate in time and place which produces a further improvement in granulometry, smoother ovoid spheres yet freer of nodules, and reduces the minute specks still further, while making the process more controllable and the product more uniform. In application Ser. No. 516,303 is described an improvement, in two stages in one vessel, using an improved catalytic method involving a plurality of catalysts. In the present invention the new catalytic method has been extended to polymerization in mass in stages separate in time and place.

In the separate stage processes the monomer is polymerized to about 7–15%, preferably 8–10%, in an autoclave called a prepolymerizer, with strong agitation. At the end of that stage of polymerization the mass is transferred to a second autoclave and polymerized to an appropriate endpoint (70–85% in many cases). It has proved to be advantageous to carry out a single stage of polymerization, as described, using a sequence of catalysts, but in attempting to extend that invention to the separate stage process, certain difficulties were encountered, especially that it was difficult to determine with sufficient precision at what moment the transfer of the fluid monomer-polymer mass should be made. It was proposed to determine the quantity of heat liberated during prepolymerization on the theory that this would be directly related to the weight of the polymer formed, from which could be deduced the degree of conversion of the monomer, but industrial apparatus is not sufficiently accurate to make this determination with the necessary precision. Another method was proposed by which samples would be withdrawn during the prepolymerization and analyzed for solids. That method had the disadvantage that the polymerization proceeded materially before the determination could be made.

[Column 2]

It is an object of the invention to polymerize vinyl chloride in mass, with or without compatible monomers, in a two step process involving transfer of the reaction mass from one autoclave to another, of which the first is provided with strong agitation and the second with mild agitation, in the first of which there is employed a catalyst of short half life and in the second one of long half life, and in this process to effectuate the transfer of the partly polymerized mass when a selected degree of polymerization has been reached. The new process provides means of determining the appropriate time. In the novel process the catalyst used in the first stage has a half life of short duration and, consequently, loses its catalytic quality rapidly after its half life has passed, so that by selecting the temperature of polymerization with respect to the half life of the catalyst an accurate moment of transfer can be determined in advance. Thus, if a transfer is to occur at 10% polymerization a catalyst will be selected, the half life of which is reached substantially before 10% polymerization has occurred and the polymerization will be permitted to continue beyond the half life for that period of time which will produce the 10%. At that time the consumption of catalyst will have reduced the activity of the process so much that the reaction mass can be flowed to the second autoclave in a condition approaching inertia. The prepolymerization being very exothermic, it can be arrested when a lowering of the temperature is observed; the time when the lowering of temperature is observed, is a function of the quantity of catalyst employed.

In carrying out the invention in distinct apparatus in a plurality of steps, the first step is carried out in a autoclave having a high speed agitator to a polymerization on the order of 7–15% and preferably about 8–10% in the presence of a catalyst of rapid decomposition, one which has a half life less than several hours and ordinarily less than 2 hours. The temperature and pressure are those customarily used in the polymerization of vinyl chloride in mass by other means. After this stage of polymerization has been reached, the liquid mass having polymer suspended in monomer is flowed to one or more autoclaves where similar conditions of polymerization exist but which contain low speed agitators, low and high being relative one to the other. The usual speed of the low speed agitator is only that which will secure good thermal uniformity in the reaction mass, the temperature of polymerization being maintained by flowing all the parts of the reaction mass into regular contact with temperature control means, such as a cooling jacket. This stage also takes place in the presence of a catalyst which decomposes slowly, which, in many cases, has a half life of the order of 5–10 times that of the catalyst of short half life used in the prepolymerizer. Good general practice suggests the use of catalysts in the first stage autoclave having a half life of about 1½ hours, or less, at the temperature and under the condition of the reaction. The half life of a particular catalyst, for instance benzoyl peroxide, under a particular state of conditions is determined in advance, by test, and charted for subsequent use in plant routine. In this way the prepolymerization of an average length of 1–2 hours can be established for a conversion of between 7 and 10%. Under these circumstances a major portion of the catalyst will have been consumed during the first stage and the reaction will arrest or materially retard itself so that the reaction mass can be transferred in an approximately latent state at the temperature of polymerization without fear of a lack of control.

It is thus possible to separate the first and later stages in time and place while retaining full control of the process and of the constitution of the product.

The objects of the invention are attained, generally speaking, by a process of polymerizing vinyl chloride in bulk which comprises initiating the polymerization at appropriate temperature and pressure with strong agitation, compared to that of a later stage of the process, in contact with a catalyst of half life which expires before 15% of the vinyl chloride has polymerized, transferring the mass while it is still fluid to another space at similar temperature and pressure and continuing the polymerization to its selected end point with relatively mild agitation, compared to the initial agitation, in contact with a catalyst of active life which outlasts the process.

In operation the final stage of the polymerization is carried out in a controlled manner to its end point in contact with a catalyst having a slow rate of decomposition, slow meaning in comparison to the rate of decomposition of the first-stage catalyst and one which produces a conversion of 70–80% in a total time of about 9–15 hours, including the time in the first-stage autoclave. Such slow catalysts have a half life circa 10 to 40 hours. For example, one might use a catalyst of 1 hour half life in the first stage and of 10 hours half life in the second.

This permits the addition of both catalysts at the start of the process, as the slow catalyst will have almost no effect in the first stage or in the period of transfer from autoclave to autoclave, which usually takes only about one minute. However, in many cases it is the preferred practice to add the slow catalyst after the decay of the fast catalyst is well advanced, which may favorably be done during the transfer or in the second autoclave.

The principles of this invention are applicable to all classic catalysts for this reaction but as the peroxides are often deemed to be superior, the invention is illustrated by examples taken from that group. Among the catalysts of short half life, the fast catalysts, are acetylcyclohexanesulfonyl peroxide (ACSP), dichloracetyl peroxide, and trichloracetyl peroxide. The half life of ACSP is 40 minutes at 620° C. and the first stage under those conditions will produce 7 to 15% polymerization in 60–75 minutes. If the temperature is 55° C. the half life of ACSP will be about 1 hour 15 minutes and the first stage will take about 3 hours to produce the stated degree of polymerization. In using the other fast catalysts one may well choose conditions of temperature which will use up the half life of the catalyst in less than 1½ hours. By varying the temperature in the first stage autoclave one may change the duration of the phase of the process, and act on the physical state of the product produced by it. One may also be guided in the choice of the catalyst by the temperature to be maintained in that stage, as duration is a function of temperature.

Exemplary of slow catalysts, which decompose slowly at polymerizing temperature, and which are useful in the second stage are azodiisobutyronitrile, lauroyl peroxide, and isopropylperoxydicarbonate. Their half lives are also functions of the reaction temperature.

Apparatus suitable for the practice of the new process is described in the identified cases. It consists, generally, of a first stage autoclave or prepolymerizer which is equipped with a high speed stirrer of turbine type (for instance a bicone) capable of operating at high speeds, for instance 500–1500 r.p.m. This autoclave is equipped with all necessary apparatus of supply, temperature and pressure control, and discharge. It is connected by a pipeline to an autoclave similarly constructed but mounting a slow speed stirrer, usually of blade type, operating adjacent the wall at a few to several tens of r.p.m. Examples are given of horizontal and vertical autoclaves of cylindrical type, some having inner and outer rotary helical blades oppositely pitched, some having straight paddles, and some short or segmental paddles which are arcuately displaced from each other. It has been demonstrated that the present novel process is useful with all such apparatus.

The use of a catalyst of short half life in the first stage greatly reduces the duration of that part of the process and makes it possible to supply more than one second stage autoclave from a single first stage autoclave, for example one may supply from 3 to 5 from a prepolymerizer of moderate capacity.

The present invention makes it possible to isolate the two steps of the preparation from each other and to carry out each stage under the most favorable conditions. It is possible, by using different conditions of polymerization in the second stage, to produce products of different molecular weight from a single partial polymer. In so doing it is helpful to use the same catalyst of short half life and to choose the temperature and other conditions which produces the optimum use of that catalyst. One then determines the reaction conditions of the second stage as a function of the nature of the resin that one wishes to produce. In fact, from the mean molecular weight desired in the final product will depend the choice of the temperature of polymerization and, in consequence, the choice of the slow catalyst which is to be used. This variant of the process is particularly useful when several qualities of resin are to be produced simultaneously from a single quality of monomer-prepolymer.

The following examples illustrate the invention without limiting the generality of what has been elsewhere herein stated.

EXAMPLE 1

A vertical autoclave of 200 liters capacity, of stainless steel, provided with a turbine impeller received 170 kg. of vinyl chloride and 4.71 g. of acetylcyclohexanesulfonyl peroxide (ACSP) which corresponds to .0004% of active oxygen based on the weight of the monomer. The agitator was driven at 720 r.p.m., and the reaction chamber was raised rapidly to 62° C., which established a pressure of 9.5 kg./cm.$^2$ in the autoclave. After 1 hour 15 minutes the ACSP was practically destroyed, the progress of the reaction was very low, and the fluid mixture monomer-polymer was transferred by gravity through a stainless steel tube of about 50 mm. diameter to a horizontal, cylindrical autoclave equipped with inner and outer rotary, helical blades oppositely pitched. This autoclave had a capacity of 500 liters and it had been blown free of oxygen by the vaporization of 20 kg. of vinyl chloride monomer. The autoclave received 27.2 g. of azodiisobutyronitrile which represented .016% of the weight of the charge. Cold water was circulated in a double envelope during the transfer in order to establish a substantial pressure difference between the autoclaves. The transfer took less than a minute. After the transfer the communication between the autoclaves was cut off and the agitator was rotated at 8 r.p.m., the temperature was raised to 62° C. and the polymerization continued 12 hours and 45 minutes, after which the residual monomer was discharged, and recovered after separation from a small quantity of entrained polymer. The last of the monomer absorbed in the grains was eliminated by two successive evacuations of the autoclaves, followed by a sweepout by nitrogen. The autoclave was then opened and the impeller used to discharge the product. The yield was 71% of the monomer of a powder having a K index (Fikentscher) 62. Its apparent density was .56. It was sent to screens and revealed the following granulometry:

Table I

| Screen (microns) | Percent fallthrough |
| --- | --- |
| 630 | 99 |
| 500 | 98 |
| 400 | 98 |
| 315 | 97 |
| 250 | 94 |
| 200 | 85 |
| 160 | 50 |
| 100 | 3 |

94% of the polymer was less than 250 microns in diameter and practically all of it had a granulometry between 100–250 microns. The product, viewed under the microscope, was composed of smooth, somewhat ovoid spheres.

EXAMPLE 2

Using the same apparatus, 95 kg. of vinyl chloride were introduced with 5 kg. of vinyl acetate and 2.77 g. ACSP, which was .0004% of active oxygen on the weight of the comonomers. The conditions of polymerization were as in Example 1. After the transfer to the second autoclave 20 g. of the same slow catalyst were added which corresponded to .02% on the weight of the charge. Polymerization was continued for 10 hours at 62° C. with the same agitation as in the second stage of Example 1 and the product had an apparent density of .67, a K index of 56 and a yield of 71%. The granulometry was as follows:

Table II

| Screen (microns)— | Percent fallthrough |
|---|---|
| 630 | 97 |
| 500 | 95 |
| 400 | 94 |
| 315 | 92 |
| 250 | 91 |
| 200 | 90 |
| 160 | 35 |
| 100 | 1 |

90% of the particles were less than 200 microns, 55% of these were between 160–200 microns, and 89% were between 100–200 microns.

EXAMPLE 3

The apparatus was the same as that of Example 1 except that the second stage autoclave was of the rotary type described in one of the identified applications, provided with a line of spheres which rolled through the polymer, which kept it in a fluidified condition. The charge was 750 kg. of vinyl chloride and 150 g. of azodiisobutyronitrile catalyst. The first stage turbine was driven at 720 r.p.m. After 2 hours 45 minutes of preparation at 62° C. and 9.5 kg./cm.$^2$, the fluid mixture of monomer and polymer was flowed into the second stage autoclave with the usual precaution of purging. The autoclave contained 50 balls of 160 mm. in diameter and it was rotated at 8 r.p.m. for 11 hours 15 minutes at 62° C. Thereafter the speed was reduced to 3 r.p.m. and voided. The yield was 68.2% of polymer powder of spherical particles having a K index of 62 and an apparent density of .53. The granulometry is expressed in Table III.

Table III

| Screen (microns)— | Percent fallthrough |
|---|---|
| 630 | 97 |
| 500 | 96 |
| 400 | 94 |
| 315 | 92 |
| 250 | 90 |
| 200 | 86 |
| 160 | 82 |
| 100 | 3.5 |

82% of the particles were less than 160 microns, 78.5% were between 100–160 microns.

EXAMPLE 4

Using the same apparatus as in Example 3, the same temperature and the same pressure but ACSP in the first stage and azodiisobutyronitrile (ADBN) in the second stage. The charge was 750 kg. of vinyl chloride and 41.62 g. ACSP, which was .0004% of active oxygen on the weight of the monomer. After 1 hour 15 minutes of reaction the catalyst was practically destroyed, the mixture was transferred to the second autoclave and mixed with 135 g. of the second catalyst. The reaction was then continued for 11 hours under the conditions of Example 3. The yield was 73% and the apparent density .52. The granulometry is as shown in Table IV.

Table IV

| Screen (microns)— | Percent fallthrough |
|---|---|
| 630 | 98 |
| 500 | 96 |
| 400 | 95 |
| 315 | 91 |
| 250 | 91 |
| 200 | 85 |
| 160 | 40 |
| 100 | 2 |

The total process was 12 hours 15 minutes, substantially less than in Example 3. The quality of the product was similar but the granulometry was quite different, only 40% of the minute spheres being less than 160 microns and 45% between 160–200 microns. It is thus possible to vary the physical state and granulometry of the product.

EXAMPLE 5

The conditions of this Example are identical with those in Example 4 except that the slow catalyst used was 262 g. of lauroyl peroxide, which represents .0035% of the weight of the monomer. The conditions of reaction were the same, the polymer had a K value of 62, the apparent density was .53 and the following granulometry.

Table V

| Screen (microns)— | Percent fallthrough |
|---|---|
| 630 | 99 |
| 500 | 97 |
| 400 | 96 |
| 315 | 93 |
| 250 | 91 |
| 200 | 85 |
| 160 | 47 |
| 100 | 3 |

EXAMPLE 6

The apparatus was identical with that of Example 3, the first stage was identical with that of Examples 4 and 5. After 1 hour 15 minutes the reaction mass was transferred and mixed with 86.90 g. of isopropyl peroxydicarbonate (PDI) which yielded .0009% of active oxygen based on the weight of the monomer. The polymerization took 13 hours at 53° C. and 7.3 kg./cm.$^2$. The rotation was 8 r.p.m. The yield was 74% of powder having a K index of 70, apparent density of .46, spherical grains, and the following granulometry.

Table VI

| Screen (microns)— | Percent fallthrough |
|---|---|
| 630 | 98 |
| 500 | 97 |
| 400 | 96 |
| 315 | 95 |
| 250 | 94 |
| 200 | 90 |
| 160 | 86 |
| 100 | 12 |

86% of the particles were less than 160 microns and 74% were between 100–160 microns.

EXAMPLE 7

The apparatus is the same as in the preceding examples and the operative conditions the same as in Example 6, except that the concentration of the second catalyst was 125.53 g. of PDI changed which produced .0013% of active oxygen. The temperature was 39° C., representing a presure of 4.8 kg./cm.$^2$. The rotation of the autoclave was 8 r.p.m. and the duration 14 hours in the second stage. The yield was 69.5% and the apparent density .36. The K value was 80 and the granulometry as indicated in the table.

Table VII

| Screen (microns) | Percent fallthrough |
|---|---|
| 630 | 96 |
| 500 | 94 |
| 400 | 93 |
| 315 | 92 |
| 250 | 90 |
| 200 | 79 |
| 160 | 56 |
| 100 | 2 |

EXAMPLE 8

A vertical autoclave of 200 liters capacity, of stainless steel, provided with a turbine impeller of about 160 mm. diameter driven at 700 r.p.m., received 95 kg. of vinylchloride, 5 kg. of vinylacetate, 23 g. (.023%) of azodiisobutyronitrile. After 2 hours 30 minutes at the temperature corresponding to 9.5 kg./cm.$^2$, there was a transformation of 8.7%. The second stage, after transfer, continued for 11 hours 30 minutes for a total of 14 hours, and the pressure dropped to 9.2 kg./cm.$^2$. The yield was 70% and the apparent density of the product was .64. The finest particles were tested and had a density of .62. The grains were essentially spherical, 88% of them had diameters less than 200 microns and 87% between 100–200 microns.

Table VIII

| Screen (microns) | Percent fallthrough |
|---|---|
| 630 | 96 |
| 500 | 94 |
| 400 | 92 |
| 315 | 91 |
| 250 | 90 |
| 200 | 88 |
| 160 | 68 |
| 100 | 1 |

EXAMPLE 9

Using the same apparatus as in Example 8, the first stage autoclave was charged with 95 kg. of vinyl chloride and 5 kg. of vinyl acetate. 5.55 g. of ACSP were added to provide .0004% active oxygen. After 1 hour 15 minutes at 62° C. the catalyst was substantially destroyed and the reaction mass was transferred to the rotating autoclave where it received 20 g. (.02%) of azodiisobutyronitrile. The reaction continued at 62° C. for 10 hours. The yield was 71%, the K value 56 and the apparent density .64. The granulometry was as follows:

Table IX

| Screen (microns) | Percent fallthrough |
|---|---|
| 630 | 97 |
| 500 | 95 |
| 400 | 93 |
| 315 | 91 |
| 250 | 90 |
| 200 | 88 |
| 160 | 68 |
| 100 | 1 |

In 11 hours 15 minutes there was produced a copolymer similar to that obtained in Example 8 but in 2 hours 45 minutes less time. The invention, therefore, substantially increases the output of the apparatus employed and reduces the cost of manufacture.

The process has also been carried out with equal successful results in apparatus having horizontal, cylindrical autoclaves provided with rotary, paddle type stirrers, the paddles of which operate adjacent the wall of the cylinder and extend from end to end thereof. This particular modification has the advantage that the control of polymerization in the second stage is particularly accurate and easy.

EXAMPLE 10

In this example, for purposes of comparison, only one catalyst was used in both stages of the process. The first stage autoclave was vertical and provided with a high speed stirrer of turbine type. It received a total of 170 kg. of vinyl chloride monomer and 30.6 g. (.018%) of azodiisobutyronitrile. The speed of the impeller was 720 r.p.m. The temperature was 62° C. and the pressure 9.3 kg./cm.$^2$. After 3 hours of polymerization under these conditions the fluid mixture was transferred to the fixed autoclave, which had a capacity of 500 liters and a paddle stirrer rotating at 30 r.p.m. The temperature of the mixture was 62° C. and the duration of the second stage 13 hours for a total of 16 hours. The yield was 70% of a powder of spherical grains having a K value of 62, an apparent density of .56 and a granulometry of:

Table X

| Screen (microns) | Percent fallthrough |
|---|---|
| 630 | 98 |
| 500 | 98 |
| 400 | 97 |
| 315 | 95 |
| 250 | 95 |
| 200 | 93 |
| 160 | 82 |
| 100 | 7 |

EXAMPLE 11

The apparatus was the same as in Example 10 and the conditions were the same with the exception that ACSP was the catalyst of which 9.435 g. yielded .0004% active oxygen based on the weight of the monomer. After 1 hour 15 minutes the catalyst was practically inactive, the mass inert, and the transfer to the second stage autoclave was made where the mass was mixed with 27.2 g. of azodiisobutyronitrile (.016% of the reaction mass). The speed of the paddles was 30 r.p.m. and the second stage continued for 12 hours 45 minutes for a total of 14 hours. The yield was 71%, the K value 62, the apparent density .57, and the granulometry was as follows:

Table XI

| Screen (microns) | Percent fallthrough |
|---|---|
| 630 | 99 |
| 500 | 98 |
| 400 | 98 |
| 315 | 97 |
| 250 | 94 |
| 200 | 92 |
| 160 | 80 |
| 100 | 4 |

Comparing Examples 10 and 11 it is observed that there is a better yield in Example 11, a slightly higher density, and a granulometry like that of Example 10 but with a saving to 2 hours.

EXAMPLE 12

The apparatus of the preceding examples was used and charged with 95 kg. of vinyl chloride and 5 kg. of vinyl acetate. 5.55 g. of ACSP was used. The speed of the impeller was 720 r.p.m., the temperature 62° C. and the relative pressure 9.3 kg./cm.$^2$. After 1 hour 15 minutes the catalyst was practically inert, the process was practically stopped, and the mass was transferred to the second stage autoclave where is was mixed with 20 g. of azodiisobutyronitrile which was .02% by weight of the reaction mass. After 10 hours 30 minutes of copolymerization, making a total of 11 hours 45 minutes at 62° C., the yield was 75%, the K value 56, and the apparent density .68. The granulometry is shown in Table XII.

Table XII

| Screen (microns) | Percent fallthrough |
|---|---|
| 630 | 98 |
| 500 | 96 |
| 400 | 95 |
| 315 | 93 |
| 250 | 90 |
| 200 | 87 |
| 160 | 25 |
| 100 | 0 |

It is noteworthy that 87% of the particles of copolymer, which were minute spheres, were less than 200 microns in size and that 62% were between 160–200 microns in size.

The new process can also be carried out with equal success in apparatus similar to the foregoing but in which the second stage autoclave is a horizontal cylinder provided with circumferentially offset paddles, each of which is less than the length of the cylinder.

EXAMPLE 13

The first stage autoclave is the same as that described above and it was operated under like conditions upon 170 kg. of vinyl chloride and 30.6 g. of azodiisobutyronitrile. The temperature was 62° C. After 3 hours the mixture was run into the second stage autoclave, which was of 500 liters capacity, and provided with the fragmentary, paddle type stirrer. To aid the transfer the water jacket of the horizontal autoclave was strongly chilled to create a difference in pressure. After the transfer the valve between the autoclaves was turned off and the temperature inside the autoclave raised to 62° C. and held there for 14 hours. The total time of reaction was 17 hours. The yield was 72.6%, the K value 62, and the apparent density .58. The granulometry is set forth in the table.

Table XIII

| Screen (microns) | Percent fallthrough |
|---|---|
| 630 | 99.5 |
| 500 | 99 |
| 400 | 98 |
| 315 | 96 |
| 250 | 96 |
| 200 | 84.5 |
| 160 | 27 |
| 100 | 1 |

EXAMPLE 14

The apparatus was that of Example 13. The first stage autoclave receive 170 kg. of vinyl chloride, after purging, and 9.435 g. of ACSP. The speed of the stirrer in both examples was 720 r.p.m. After 1 hour 15 minutes the catalyst was practically destroyed and the mixture practically inert and the transfer was made in the same way to a second stage autoclave where the mass was mixed with 27.2 g. of azodiisobutyronitrile (0.16%). The speed of the paddles was 8 r.p.m. and the polymerization was continued for 12 hours 45 minutes for a total of 14 hours. The yield was 76%, the K value 62, and the apparent density .59. The granulometry is shown in the table.

Table XIV

| Screen (microns) | Percent fallthrough |
|---|---|
| 630 | 99 |
| 500 | 99 |
| 400 | 99 |
| 315 | 98 |
| 250 | 97 |
| 200 | 90 |
| 160 | 30 |
| 100 | 1 |

By comparing Example 14 with Example 13 it is apparent that the present invention improves the yield, somewhat increases the apparent density, and provides a granulometry similar to that of Example 13. Saving of 3 hours in carrying out the process is of great importance.

EXAMPLE 15

The apparatus was the same as that in the two preceding examples. The first autoclave, after purging, was charged with 95 kg. of vinyl chloride and 5 kg. of vinyl acetate. 6.55 g. of ACSP was added to the comonomers, the speed of the paddles was 720 r.p.m. and the temperature 62° C. After 1 hour 15 minutes of polymerization the catalyst had become substantially inert, the progress of polymerization extremely slow and the mass was transferred to the second stage autoclave where it was mixed with azodiisobutyronitrile, of which 20 g. corresponds to .02 g. of the catalyst on the weight of the mixture. Polymerization continued for 10 hours 45 minutes at 62° C. at a speed of 8 r.p.m. for a total of 12 hours. The yield was 77%, the K value 56 and the apparent density .69. The granulometry is shown in the table.

Table XV

| Screen (microns) | Percent fallthrough |
|---|---|
| 630 | 98 |
| 500 | 97 |
| 400 | 93 |
| 315 | 92 |
| 250 | 90 |
| 200 | 85 |
| 160 | 23 |
| 100 | 1 |

85% of the particles of the copolymer were less than 200 microns in size and 62% of the particles were between 160–200 microns.

In this and in all of the other examples herein given, the particles were spherical when observed under the microscope, differing from all known types of polymer except those which are disclosed in the cases referred to at the beginning of this specification. Prior to those inventions the polymers produced were cloudlike, and totally irregular in size, thickness, and shape. The globular form of the polymer particles is a phenomenon which is achieved only by the inventions described in the present series of cases.

The new process can also be carried out in a first stage autoclave with a rapid catalyst and strong agitation until 7–15% polymerization has taken place, the reaction being terminated before 15% has been substantially polymerized, and the reaction mass transferred to a second stage autoclave where it is mixed with a catalyst of long life. This second autoclave may be vertical and provided with a helix or helixes operating from a central shaft to circulate the polymer from the wall to the center and back again, the speed of the helix being sufficient to secure heat transfer with the water jacket of the autoclave whereby to maintain good reaction conditions. The effect of the total of these examples is that the new process is not dependent upon a particular type of apparatus but adapts itself readily to the old types, a catalyst of short half life being used in a first stage autoclave and a catalyst of long half life being used in a later stage. The present variant has possibilities of simple, efficacious operation with fine control of conditions.

EXAMPLE 16

A vertical, cylindrical autoclave of 1000 liters capacity made of stainless steel and containing an agitator 300 mm. in diameter of turbine type rotating at 720 r.p.m., received 800 kg. of vinyl chloride and 144 g. (.018%) of the weight of the monomer of azodiisobutyronitrile, the total catalyst. The temperature was 62° C. After 2 hours of polymerization the mixture was transferred by gravity to a vertical autoclave of 2 cubic meters having a vertical, helical agitator operating upward adjacent the wall. The speed of rotation of the helical agitator was 10 r.p.m. and the temperature was 62° C. The duration of the second stage was 13 hours for a total of 15 hours. The yield was 70.8%, the K value 62, and the apparent density of the resin .52. The granulometry is stated in the table.

Table XVI

| Screen (microns)— | Percent fallthrough |
|---|---|
| 630 | 99 |
| 500 | 98 |
| 400 | 98 |
| 315 | 98 |
| 250 | 97 |
| 200 | 93 |
| 160 | 90 |
| 100 | 1 |

The majority of the particles were of diameters above 100 microns and were inferior to 160 microns. Similar results are obtained if the speed of the helix is reduced to 5 r.p.m.

EXAMPLE 17

The apparatus was that used in Example 16. The first stage autoclave received 800 kg. of vinyl chloride and 44.4 g. of acetylcyclohexanesulfonyl peroxide which corresponds to .0004% of active oxygen relative to the weight of the monomer. The speed of the turbine agitator was 720 r.p.m. After 1 hour 15 minutes the catalyst was practically exhausted and the mixture was flowed to the second vertical autoclave where it was mixed with 128 g. of azodiisobutyronitrile (.016% of the reaction). The helical agitator was run at 10 r.p.m., the polymerization was continued for 12 hours 15 minutes for a total of 13 hours, 30 minutes. The yield was 72.2% of a powder having a K value of 62 and an apparent density of .53. The granulometry of the product is shown in the table.

Table XVII

| Screen (microns)— | Percent fallthrough |
|---|---|
| 630 | 99 |
| 500 | 99 |
| 400 | 99 |
| 315 | 99 |
| 250 | 98 |
| 200 | 92 |
| 160 | 87 |
| 100 | 1 |

The overall time of reaction is less than that of Example 16. Furthermore, by changing the duration of the first stage polymerization in the presence of the rapid catalyst, one can change the properties of the final product. Furthermore, after the polymerization mass in the first stage polymerization has reached an inert state, it can be held there in fluid state containing minute particles of polymer suspended in liquid monomer until it is to be transferred to the second stage autoclave for development.

EXAMPLE 18

This example utilizes the same apparatus as the two preceding examples but it is directed to a copolymerization of 760 kg. of vinyl chloride and 40 kg. of vinyl acetate. The catalyst was 44.4 g. of ACSP and the speed of rotation was 720 r.p.m. The temperature was 62° C. After 1 hour 15 minutes of polymerization, the rate of the reaction being greatly retarded, the mixture was transferred to the second stage autoclave and mixed with the catalyst of slow decomposition rate, in this case azodiisobutyronitrile, of which 144 g. (.018%) was present. After 11 hours of copolymerization at the agitator speed of 10 r.p.m., providing a total reaction time of 12 hours, 15 minutes, the temperature being maintained at 62° C., the yield was 72.6%, the K value 56 and the apparent density .68. The granulometry of the product is shown in the table.

Table XVIII

| Screen (microns)— | Percent fallthrough |
|---|---|
| 630 | 99 |
| 500 | 98 |
| 400 | 97 |
| 315 | 95 |
| 250 | 92 |
| 200 | 90 |
| 160 | 30 |
| 100 | 0 |

90% of the particles had sizes inferior to 200 microns and 60% of these were between 160–200 microns.

The examples have been carried out for purposes of comparison, therefore similar conditons of polymerization have been used throughout. This is not to be taken as a limitation because the process is susceptible to wide variation in the speeds employed in each autoclave, in the temperatures used, which will vary with the monomers employed, in the time of transfer from one autoclave to the other, in the relative time spent in each autoclave and in the catalyst used.

The process is applicable to the polymerization in mass of vinyl chloride and compatible monomers of which the following are representative: vinyl acetate, vinylidene chloride, acrylonitrile, maleic anhydride . . . .

The catalysts employed in the polymerization of vinyl chloride in mass are preferably peroxides, and that choice is particularly advantageous in the present invention because some of the peroxides are of short half life and adapted to the first stage, while others are of long life and adapted to use in the second stage. It is characteristic of the first stage to employ vigorous agitation and of the second stage to employ mild agitation. The peroxides are also useful because they decompose during use at relatively uniform rates. Nevertheless, other catalysts of relatively short and relatively long half lives can be used in respective stages of the process: for example azodimethylvaleronitrile.

As many apparently widely different embodiments of the present invention may be made without departing from the spirit and scope thereof, it is to be understood that the invention is not limited to the specific embodiments.

What is claimed is:

1. A process of polymerizing monomeric compositions containing at least a preponderant part of vinyl chloride, in bulk, which comprises initiating the polymerization at appropriate temperature and pressure with strong agitation sufficient to entrain the materials being reacted and the formed polymer in a turbulent movement, in contact with a catalyst of short life under the conditions of polymerization of about two hours, and effective to prepolymerize the monomers to the order of 7 to 15% said agitation being maintained throughout said polymerization, transferring the mass while it is still fluid to another apparatus, said apparatus being maintained at appropriate temperature and pressure for further polymerization and continuing the polymerization to its selected endpoint with a mild agitation sufficient to assure a good heat exchange within the mass, in contact with a catalyst of relative long half life compared to that of the catalyst used in the first stage, in which said second catalysts' half life is about 5 to 10 times the duration of the half life of the first catalyst at the temperature of polymerization.

2. The process of claim 1 in which the reaction mass of the first stage containing the catalyst of short half life is operated at a temperature which renders such catalyst relatively inactive before the polymerization substantially exceeds 15% of completion, thereby materially retarding and quieting the reaction before the initiation of the second stage.

3. The process of claim 1 in which the long half life catalyst is added with the short half life catalyst to the initial reaction mass.

4. The process of claim 1 in which the second catalyst is added to the reaction mass after the first catalyst has become relatively inactive.

5. The process of claim 1 in which the catalyst of relatively short life is a peroxide selected from the group consisting of acetylcyclohexane-sulfonyl peroxide, dichloroacetyl peroxide and trichloroacetyl peroxide and the catalyst of longer half life is selected from the group consisting of azodiisobutyronitrile, lauroyl peroxide and isopropyl peroxidicarbonate.

6. The process of claim 1 in which the catalyst of short half life is a peroxide of the type of acetylcyclohexanesulfonyl peroxide, dichloroacetyl peroxide, and trichloroacetyl peroxide.

7. The process of claim 1 in which the catalyst of long life is of the type of azodiisobutyronitrile, lauroyl peroxide, and isopropyl peroxidicarbonate.

8. The process of claim 1 in which the process consists of the polymerization of monomeric compositions containing at least a preponderant part of vinyl chloride, a catalyst of about 40 minutes at 62° C. and of about 1 hour 15 minutes half life at 55° C. being included, in the mass, and the first stage of polymerization being from about 60 minutes to about 3 hours, respectively.

9. The process of claim 1 in which the first stage of polymerization is continued substantially beyond the half life of the catalyst of short half life.

10. The process of polymerizing monomeric compositions containing at least a preponderant part of vinyl chloride, in bulk, which comprises mixing it in a first apparatus with a quantity of first catalyst, the catalytic effect of which, at the temperature of polymerization, is rapid and is exhausted after 7% and before 15% of the monomer is polymerized, and in which the period of action of the first catalyst is accompanied by violent agitation producing turbulence throughout the mass during said polymerization, mixing in a second apparatus the polymerization mass with a second catalyst having a different and slower rate of exhaustion, and continuing the polymerization under mild mixing sufficient to provide good heat transfer within the mass until 85% of the polymer grains are over 100 microns in size, said polymerization in the second apparatus, extending over a period of time at least five times as long as the first polymerization.

11. In the process of polymerizing vinyl chloride, either alone and with compatible monomers, in bulk, wherein a second stage of polymerization with mild agitation, sufficient for good heat transfer, and good heat control is preceded in time by separated in space from a first stage of polymerization with strong agitation sufficient to produce turbulence throughout the mass during the entire first stage to an end point circa 7–15% of completion, the novel steps which comprise polymerizing the vinyl chloride and such comonomers as may be present, in bulk with said strong agitation producing turbulence throughout said monomers and continuing to the endpoint circa 7–15% of completion in contact with a first catalyst for the polymerization of short half life at the temperature of polymerization, and continuing the polymerization in a second apparatus with relatively mild agitation to produce only good heat transfer and good temperature control in contact with a second catalyst for the polymerization which has a minimum half life several times that of the first catalyst at the temperature of polymerization, said second polymerization contining until an endpoint of about 70% of the monomers have been polymerized.

References Cited
FOREIGN PATENTS 1,357,736    France.

JOSEPH L. SCHOFER, Primary Examiner

JOHN A. DONAHUE, Jr., Assistant Examiner

U.S. Cl. X.R.

260—87.1, 87.5, 87.7, 85.5